United States Patent [19]

Woods

[11] Patent Number: 4,995,146
[45] Date of Patent: Feb. 26, 1991

[54] ASSEMBLY JIG AND METHOD FOR MAKING WING SPARS

[75] Inventor: Quentin T. Woods, Woodinville, Wash.

[73] Assignee: The Boeing Company, Seattle, Wash.

[21] Appl. No.: 262,894

[22] Filed: Oct. 26, 1988

[51] Int. Cl.$^5$ .............................................. B23Q 3/02
[52] U.S. Cl. ..................................... 29/281.3; 269/45; 269/910; 269/900
[58] Field of Search ...................... 269/37, 43, 45, 296, 269/71, 910, 900, 152, 289 MR, 228; 29/281.1, 281.3, 281.4, 281.5

[56] References Cited

U.S. PATENT DOCUMENTS

| | | | |
|---|---|---|---|
| 2,458,370 | 1/1949 | Geddes | 269/45 |
| 2,492,302 | 10/1980 | Stephan | 269/45 |
| 3,093,017 | 6/1963 | White | |
| 3,113,373 | 12/1963 | Guyer, Jr. | |
| 3,163,057 | 12/1964 | Drummond et al. | |
| 3,241,585 | 3/1966 | Jureit | 269/910 |
| 3,595,556 | 7/1971 | Schonauer | 269/71 |
| 3,872,815 | 3/1975 | Kawai et al. | 269/43 |
| 4,203,204 | 5/1980 | Murphy | |
| 4,310,964 | 1/1982 | Murphy | |
| 4,819,922 | 4/1989 | Boike | 269/45 |

Primary Examiner—Robert C. Watson
Attorney, Agent, or Firm—Bruce A. Kaser

[57] ABSTRACT

An assembly jig for making wing spars is adjustable in a manner so that it can be used to produce virtually any size of spar. The jig includes a plurality of vertical posts, each of which has upper and lower clamping mechanisms that are vertically adjustable. The upper mechanism holds the upper spar chord to the spar's web and the lower mechanism similarly holds the spar's lower chord. Adjustment of the clamping mechanisms relative to each other accommodates a variation in web width corresponding to different stations along the length of the spar, or alternatively, different spar designs. Each post is further adjustable in a transverse direction in order to construc spars which are not linear from end to end.

11 Claims, 6 Drawing Sheets

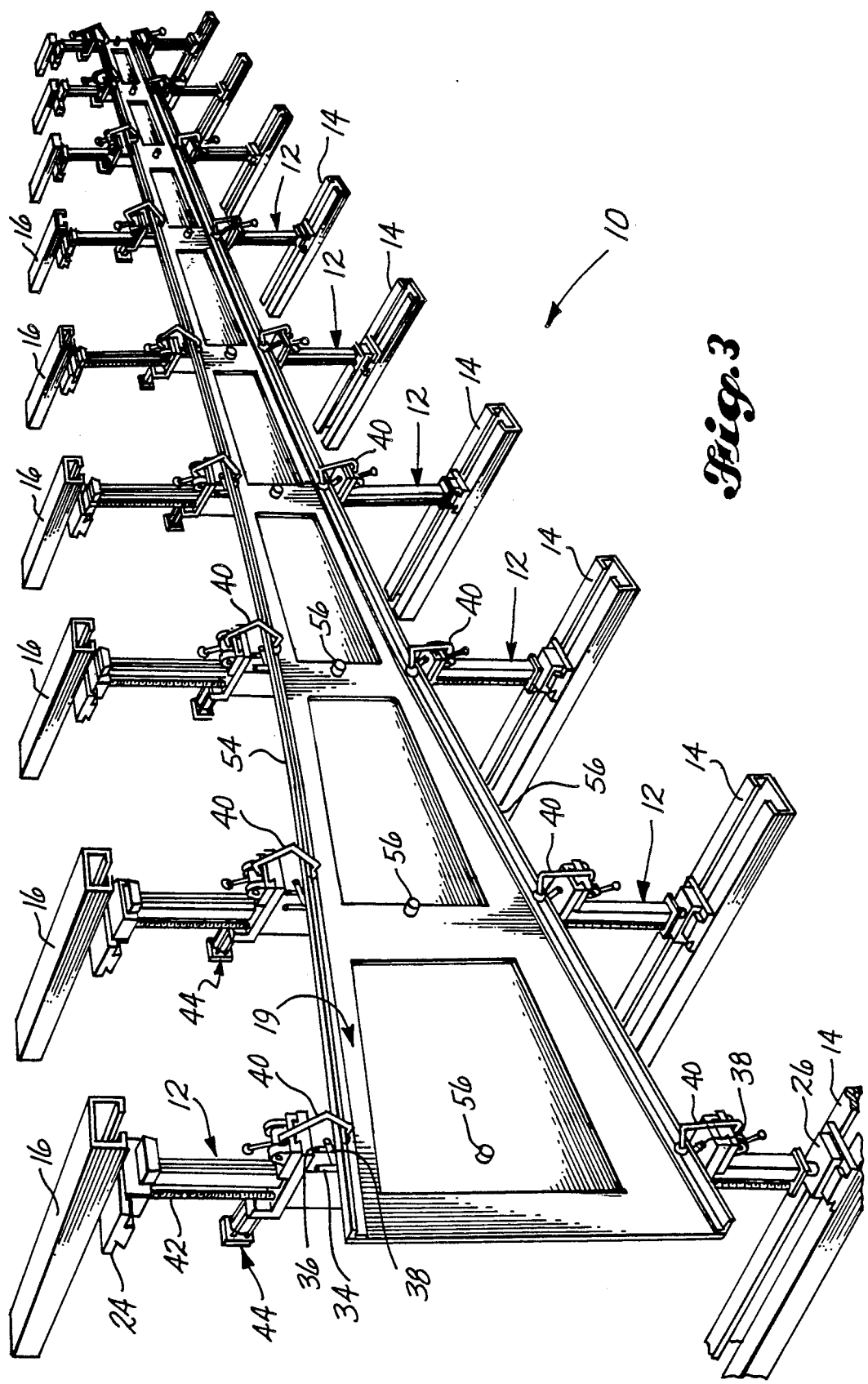

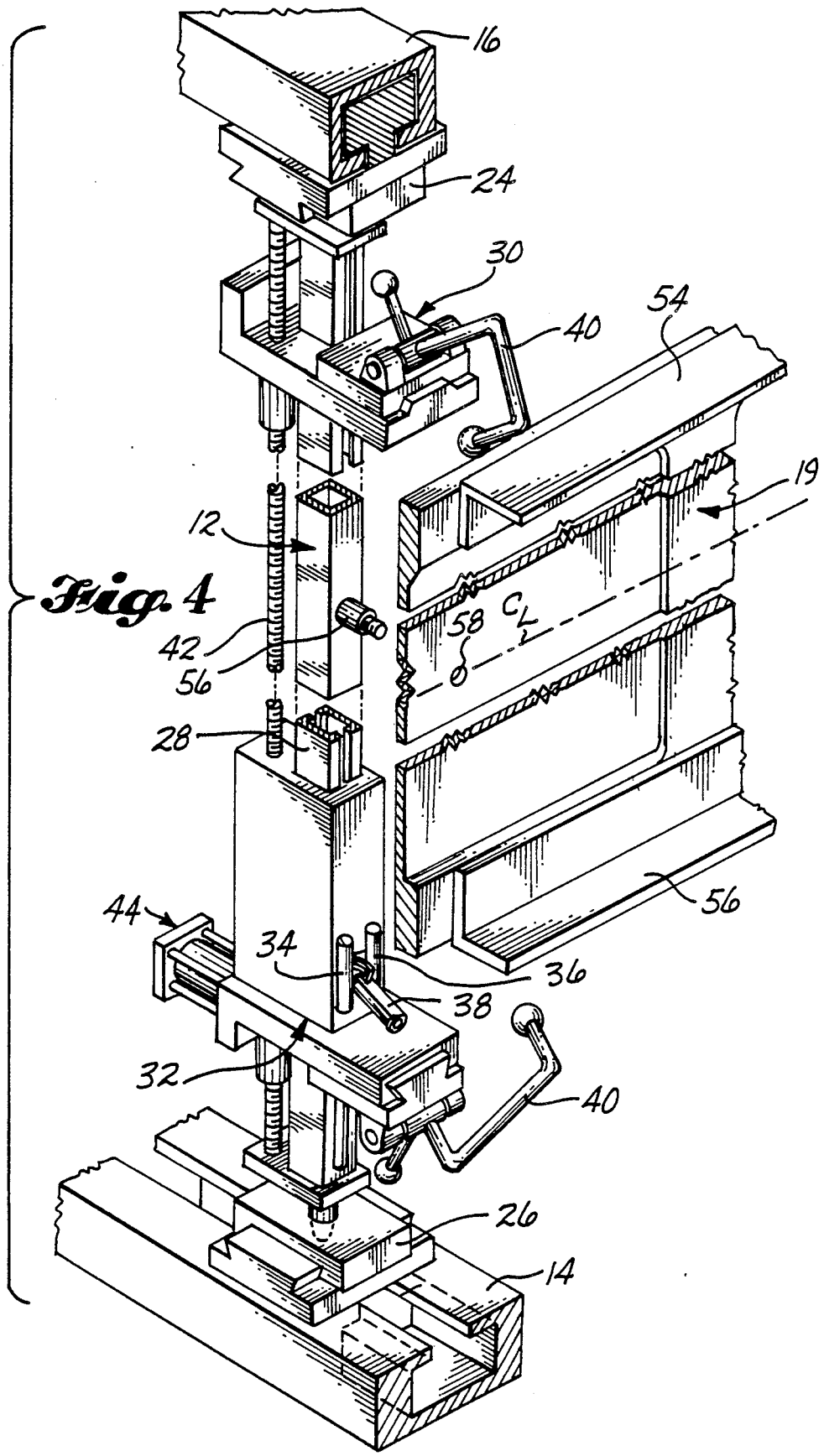

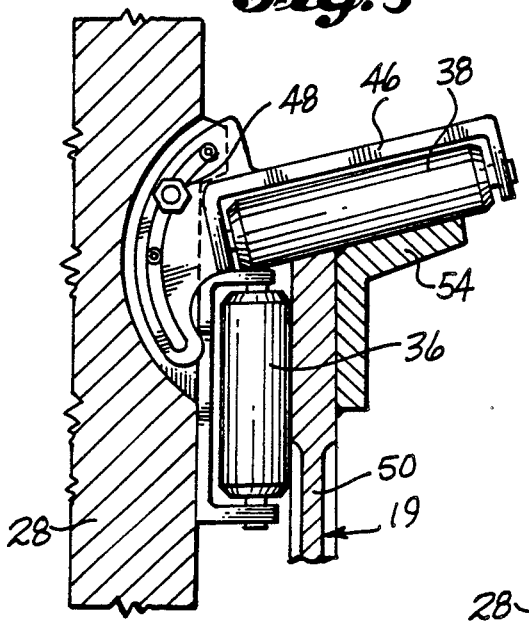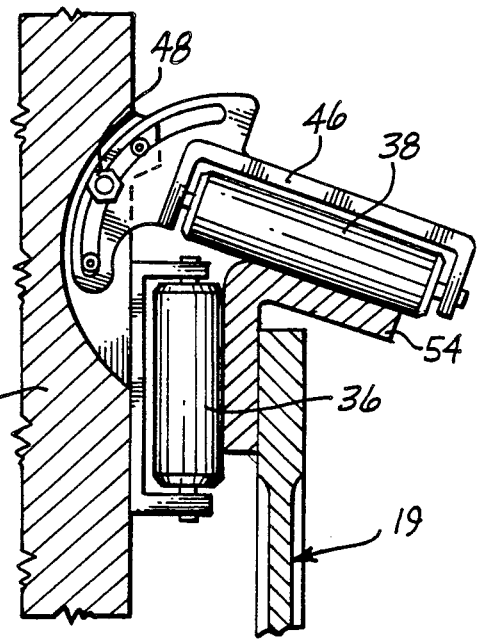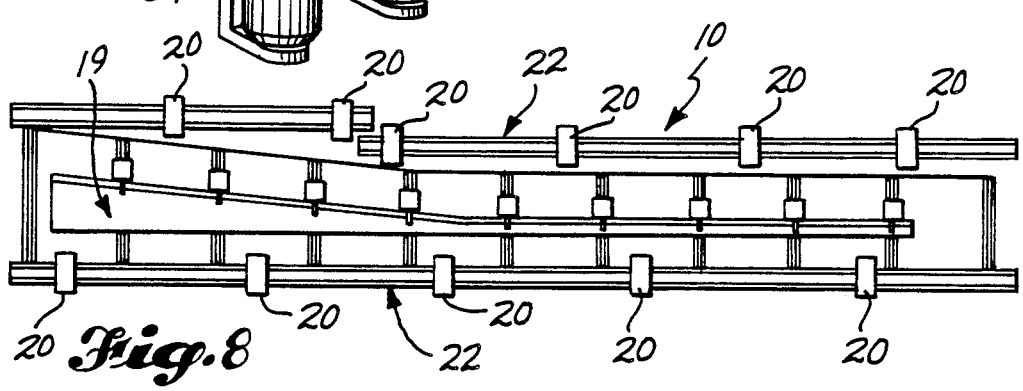

ASSEMBLY JIG AND METHOD FOR MAKING WING SPARS

TECHNICAL FIELD

This invention relates to assembly jigs that are used for making major structural components of aircraft in a production environment. More particularly, the invention relates to jigs which are used to make wing spars The subject matter disclosed in this application is related to my co-pending U.S. Pat. application Ser. No. 216,702 which was filed in U.S. Patent and Trademark Office on Jul. 6, 1988 now U.S. Pat. No. 4,894,903. The co-pending application relates to an assembly jig for making wing panels.

BACKGROUND ART

The present invention addresses the same considerations which are discussed in the background art portion of my above-referenced co-pending application. There, the invention relates to "generic" tooling for making wing panels. Here, I disclose a generic tooling concept for the making of wing spars. The economic considerations for producing generic tooling in the aircraft industry are discussed fully in my other application and therefore need not be repeated here, although it is to be understood my comments there are incorporated herein by reference.

Further, the invention disclosed here is generally related to the devices disclosed in U.S. Pat. Nos. 4,203,204 and 4,310,964, both of which relate to automated assembly machines for automatically fastening together the components of a wing spar. Many of the cost considerations associated with the production and maintenance of assembly tooling are discussed in these patents. Such considerations are equally applicable to the present invention, although these patents do not address generic tooling concepts.

The Boeing Company, which is the assignee of both of the above-mentioned patents, my co-pending application, and the invention disclosed here, currently uses two wing spar production methods. The first involves the use of a conventional gantry line that dates back to Boeing's production of the B-17. In this method, the spar is drilled by a gantry drill and is then moved to a secondary jig station where spar chord Riv bolts are installed by hand. Afterward, the spar is moved to a third station where stiffener and rib posts are fastened by manual operations.

The second and more modern method utilizes ASAT (Automatic Spar Assembly Tool) tooling of the type disclosed in the above two patents. This method is currently in use in the construction of the more recent models of Boeing aircraft.

Regardless of the particular spar production method used by Boeing, dedicated spar tooling has been put into place for each spar design. The duplication in tooling serves as a cost multiplier which directly impedes Boeing's ability to compete.

The present invention provides a generic spar assembly jig that provides the aircraft manufacturer with the capability of building any wing spar from a single set of tooling. This eliminates unnecessary duplication in tooling and greatly reduces floor space and other facility requirements. The result is an enhancement of the manufacturer's ability to significantly reduce costs and to therefore better compete with not only domestic aircraft manufacturers but also overseas manufacturers who are oftentimes subsidized by their governments.

DISCLOSURE OF THE INVENTION

The present invention provides a universal or generic spar assembly jig adapted for use to produce various wing spars depending on the wing design in which any individual spar is to be used. As would be familiar to a person skilled in the art, the typical wing spar includes a web or web portion having upper and lower longitudinal edges to which upper and lower spar chords are respectively attached. A plurality of stiffeners and/or rib posts are positioned along the length of the spar transversely extending across the web and between the spar chords. The stiffeners and rib posts are fastened directly to both chords and web.

A spar assembly jig in accordance with this invention has a plurality of vertically upstanding tooling posts or spar-holding members, each of which includes upper and lower clamps positioned adjacent the web's upper and lower longitudinal edges, respectively. The clamps hold the chords to the web as these components are fastened together.

Preferably, each clamp is in the form of a conventional "Destaco" clamp and further includes a pair of spaced, vertical rollers. Another adjustably pivotable roller is positioned between the vertical rollers. The rollers define the position of the spar chords relative to the web and the Destaco clamp tightly holds the chord against the web's edge.

The tooling posts are positioned in series along the length of the jig. The vertical position of the clamps on each post is adjustable in order to accommodate the variations in width of the particular spar being assembled. Each tooling post is mounted to the jig by transverse tracks which permit lateral positional adjustment of the posts along the length of the spar. The purpose of this is to permit assembly of certain spars which are not continuously straight from end to end but which are bent or curved.

Each tooling post has a registration pin which is fixed in position on the post. The pins of all the posts define a generic centerline which is common to any spar assembled on the jig. They provide a means for mounting and registering each spar's web on the jig in the proper position relative to the centerline.

An advantage to the present invention is that it provides a multi-drilling and riveting station that increases productivity. This is in contrast to the gantry method, for example, where a single gantry drill is used for drilling at one location and riveting is done at another location. In the present invention, drilling and rivet insertion can be done from either side of the spar in the jig which eliminates the need to change locations.

A second advantage to the invention is that it allows each spar chord the freedom to expand relative to the web during drilling and riveting. This eliminates induced stresses caused by cold working during the installation of high interference fasteners. The result is a higher quality finished product.

A third advantage to the invention is that like the generic tooling disclosed in my co-pending application relative to wing panel construction methods, a spar assembly jig constructed in accordance with this invention can be used to manufacture virtually any spar. This eliminates duplication in tooling, and the higher costs associated therewith.

The many advantages of the present invention will become apparent to the reader upon consideration of the drawings in connection with the description which follows.

BRIEF DESCRIPTION OF THE DRAWINGS

In the drawings, like reference numbers and numerals refer to like throughout the various views, and wherein:

FIG. 3 is a view like FIG. 2, but shows a spar held in place by clamps and fixed registration pins on the various tooling posts;

FIG. 4 is a view of one of the tooling posts shown in FIGS. 1-3;

FIG. 5 is an enlarged, side cross-sectional view of the roller members which are used to position the spar's chords relative to its webs as these components are clamped together;

FIG. 6 is a view like FIG. 5 but shows pivotable adjustment of the roller member relative to two vertically spaced roller members;

FIG. 7 is a pictorial view of the rollers shown in FIGS. 5 and 6;

FIG. 8 is a top plan schematic view of the jig shown in FIG. 1; and

BEST MODE FOR CARRYING OUT THE INVENTION

Figure 1:
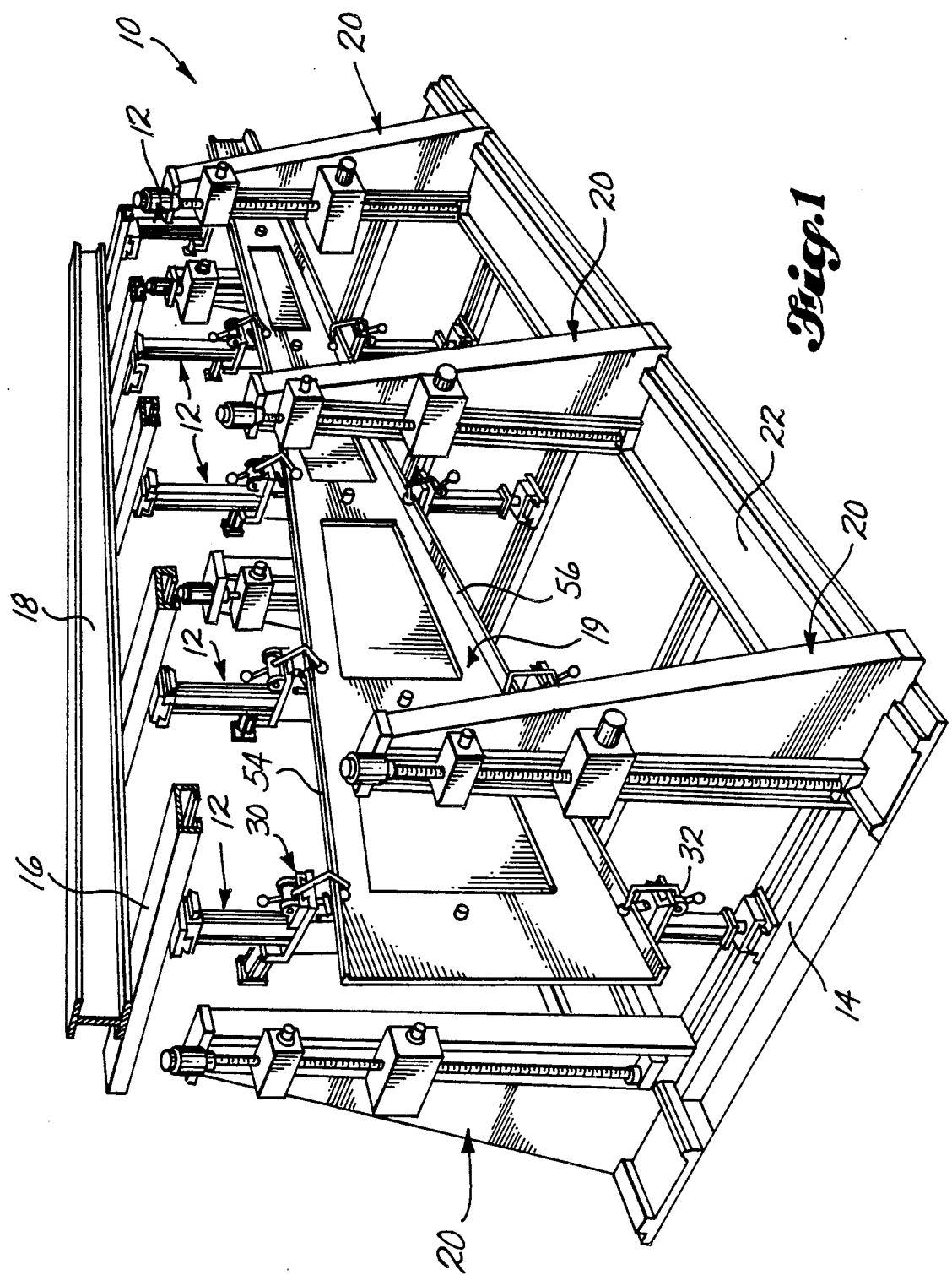
FIG. 1 is a pictorial view of the currently known best mode for carrying out the invention, and shows an assembly jig constructed in accordance with the invention having a plurality of generally vertically upstanding tooling posts, each of which is clamped to a portion of a wing spar to be assembled on the jig, and further shows horizontally travelling columns positioned on each side of the spar which drill and fasten the spar's components together.
Figure 2:
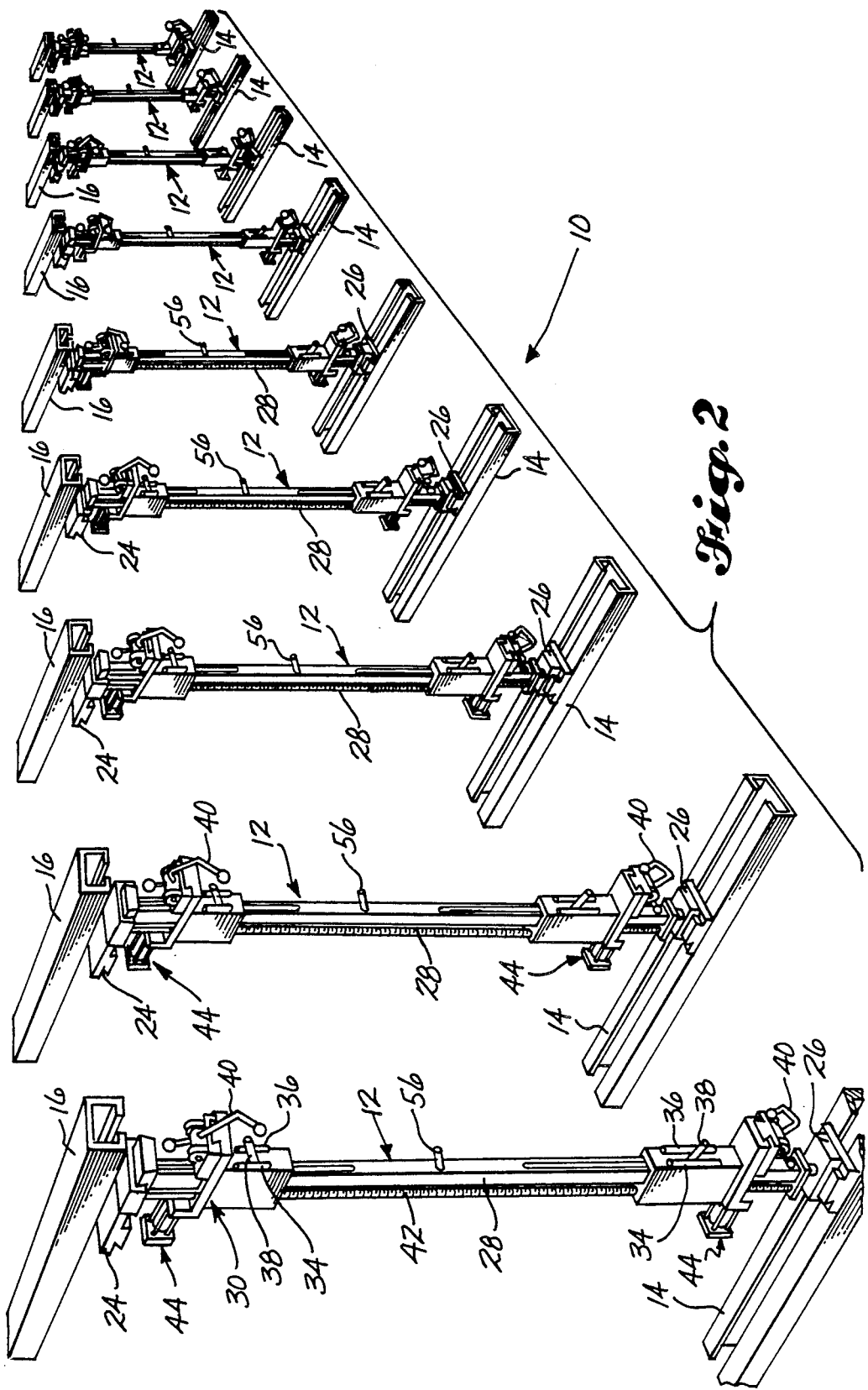
FIG. 2 is a view similar to FIG. 1 but with the horizontally travelling columns and wing spar removed.

Referring now to the drawings, and first to FIG. 1, therein is shown at 10 a generic wing spar assembly jig constructed in accordance with a preferred embodiment of the invention. The jig 10 includes a plurality of posts, each of which is indicated by reference numeral 12, whose ends are in sliding engagement with upper and lower tracks 14, 16. The lower tracks 14 may be mounted directly to the floor of the work space in which the jig 10 is utilized.

The upper tracks 16 are connected directly to any suitable frame structure such as the overhead beam 18 shown in FIG. 1. It would be appreciated by a person skilled in the art that beam 18 would be fixedly connected to other framework not shown in the drawings.

A spar 19 is held by posts 12 wherein the posts hold the spar's components during fastening. This is best illustrated in FIG. 3. Fastening is accomplished by a plurality of horizontally travelling columns which are generally indicated at 20 in FIG. 1. These columns 20 are positioned on opposite sides of the posts 12 and provide a means for drilling, riveting and bucking the spar 19 from either side. As a person skilled in the art would know, these units are commercially available from several U.S. machine tool manufacturers.

Figure 9:
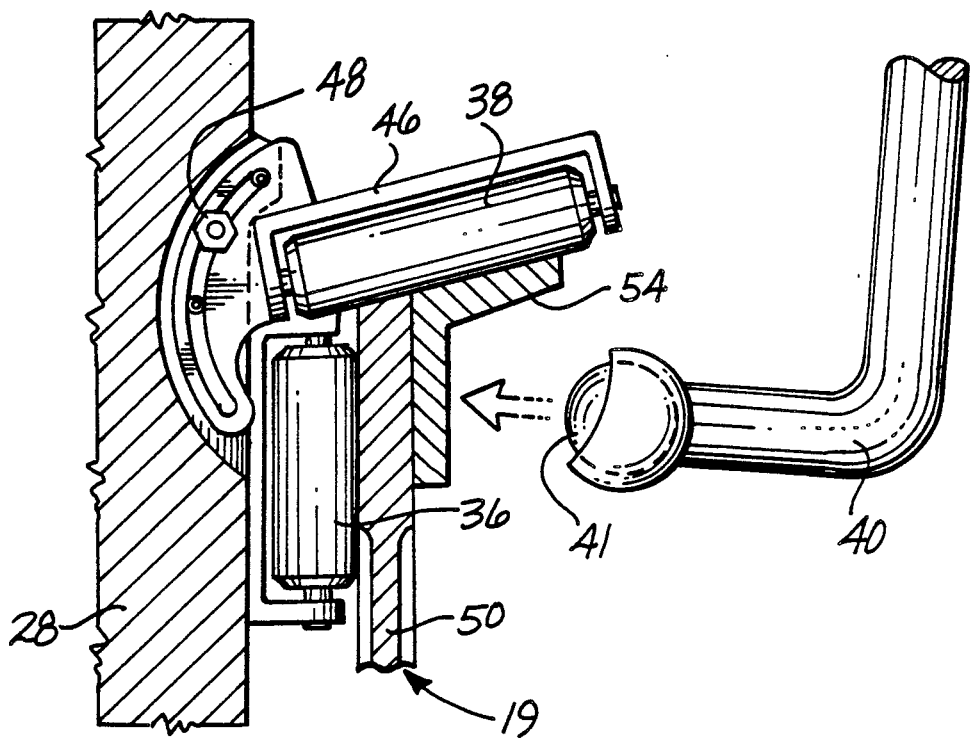
FIG. 9 is a view like FIG. 5 but shows the end of a clamp moving into position against a spar chord.

Referring to FIG. 3, spar web 19 is held by the post 12 and registered to the spar web centerline by orientation or registration pins 56. At any post location, the spar chords, upper and lower, are set at an assigned vertical distance from the centerline location pin 56 by contact of the rollers 34 and 36. Vertical registration against these rollers is induced by a conventional Destaco clamp 40. FIG. 9 also shows the clamp 40 as having a spherical ball end 41. This arrangement not only establishes vertical registration of the upper and lower spar chords to the spar web centerline but permits the spar chord material to actually move outward relative to the spar web due to expansion of the spar chords caused by cold working of drill holes and/or the installation of interference fasteners. The allowance of movement of the chords relative to the web is essential in order to substantially reduce or eliminate induced stresses in the chords and fasteners during attachment to the web.

Extending between upper and lower ends 24, 26 of each frame post 12 is a vertical section 28. As mentioned previously, the post's ends are slidably received in upper and lower tracks 16, 14 in the manner shown so as to permit transverse positioning of the post. Slidably connected to section 28 are upper and lower clamping mechanisms or clamps 30, 32. Each clamping mechanism includes a pair of vertical rollers 34, 36, a pivotably adjustable roller 38, and a conventional Destaco clamp 40. As mentioned above, Destaco clamp 40 has a spherical ball end 41. This provides clamping forces against rollers 36 and 38 but does not restrict actual movement of the spar chord. The function and operation of the Destaco clamp 40 would be well familiar to a person skilled in the art.

Both upper and lower clamping mechanisms 30, 32 are adjustable vertically in order to accommodate different widths of the spar 19. This is accomplished by a fixed lead screw 42 which extends between the post's upper and lower ends 24, 26. Each clamping mechanism 30, 32 preferably has an electrically operated nut drive 44, the construction of which would be familiar, which engages with the screw 42 for moving either mechanism upwardly or downwardly independently of the other.

FIGS. 5-7 better illustrate the construction of rollers 34, 36 and 38. Rollers 34 and 36 are fixed in position and rotate about a vertical axis. Roller 38 rotates about an axis whose angle may be adjusted relative to the axes of rollers 34, 36. This is accomplished by a pivoting bracket member 46 whose position may be adjusted by simply tightening or loosening nut 48. The angular relationship between roller 38 and rollers 34 and 36 defines the position of the spar's web 50 to its upper and lower chords 52, 54. It should be appreciated that FIG. 4 shows the roller assembly 34, 36, 38 for the post's lower clamping mechanism 32. The same assembly would be present on the upper clamping mechanism 30, although it is not shown in FIG. 4. As would be understood, FIGS. 5-7 are illustrative of the upper roller assembly.

Fixedly connected to section 28 is a fixed registration pin 56. The pins 56 in all the posts 12 define a common or generic centerline for any spar 19 to be assembled on the jig 10. Preferably, the web 50 of any spar to be assembled will have a registration hole 58 which causes the web 50 to be properly positioned when it is placed on the jig 10.

Having thus described a preferred embodiment of the invention it is to be understood that jig 10 as described above could be altered in many ways without departing from the spirit and scope of the invention as set forth in the following claims. It is to be understood, therefore, that the metes and bounds of any patent protection due as a result of the preceding disclosure are to be defined by the subjoined claims wherein the interpretation thereof is to be made in accordance with the established doctrines of patent claim interpretation.

What is claimed is:

1. A universal spar assembly jig characterized in that said jig is adaptable for use in producing wing spars having varies sizes, the size of any one wing spar being dictated by the particular wing design in which the wing spar is to be used, wherein each of said spars commonly include an elongated web, and upper and lower chord sections extending, respectively, along upper and lower longitudinal edges of said web, said spar assembly jig comprising:

a plurality of vertically upstanding spar-holding posts, each post including first clamp means, positioned adjacent said web's upper longitudinal edge, for both holding said web in a vertically upright position and for holding said upper chord section against said upper longitudinal edge, and second clamp means, positioned adjacent said web's lower longitudinal edge, for both holding said web vertically upright and holding said lower chord section against said lower longitudinal edge, wherein both said first and second clamp means are connected to said spar-holding post in a manner so that the vertical position of each clamp means is adjustable, to accommodate a variation in width of the web for the particular spar which is to be assembled on said jig; and transverse track means for permitting lateral positional adjustment of said spar-holding posts with respect to each other along the length of said spar.

2. The assembly jig of claim 1, wherein each spar-holding post further includes web registration means fixed to said post between said first and second clamp means, wherein said registration means of all said spar-holding posts are substantially colinear with respect to each other and define a common centerline axis for any spar which is to be assembled on said jig.

3. The assembly jig of claim 2, wherein said first and second clamp means each includes at least one cylindrical roller member, said member being rotatable about a fixed vertical centerline axis, and an adjustably pivotable roller member that is also cylindrically shaped and rotatable about its respective centerline axis, said adjustably pivotable roller member being pivotable in a manner so that the angle of its centerline axis may be adjusted relative to the angle of said fixed vertical centerline axis, and clamp arm means, positioned adjacent said roller members, for pressing said web and spar chord tightly against said roller members.

4. The assembly jig of claim 3, wherein said first and second clamp means each further includes a pair of cylindrical roller members, each roller member of said pair being rotatable about a separate fixed vertical centerline axis, said pair being laterally spaced from each other, and wherein said adjustably pivotable roller member is positioned between said pair of roller members.

5. A universal spar assembly jig characterized in that said jig is adaptable for use in producing spars having varied sizes, the size of any one spar being dictated by the particular design in which the spar is to be used, wherein each of said spars commonly include an elongated web, and upper and lower chord sections extending, respectively, along upper and lower longitudinal edges of said web, said spar assembly jig comprising:

a plurality of vertically upstanding spar-holding posts, each post including first clamp means, positioned adjacent said web's upper longitudinal edge, for both holding said web in a vertically upright position and for holding said upper chord section against said upper longitudinal edge, and second clamp means, positioned adjacent said web's lower longitudinal edge, for both holding said web vertically upright and for holding said lower chord section against said lower longitudinal edge, wherein both said first and second clamp means are connected to said spar-holding post in a manner so that the vertical position of each clamp means is adjustable, to accommodate a variation in width of the web for the particular spar that is to be assembled on said jig; and transverse track means for permitting lateral positional adjustment of said spar-holding posts with respect to each other along the length of said spar, wherein said transverse track means includes an upper track member and a lower track member, and wherein upper and lower ends of each spar-holding post are, respectively, in sliding engagement with said upper and lower track members, to permit transverse movement of each spar-holding member relative to said jig.

6. The assembly jig of claim 5, wherein each spar-holding post further includes web registration means fixed to said post between said first and second clamp means, and wherein said registration means of all said spar-holding posts are substantially colinear with respect to each other and define a common centerline axis for any spar which is to be assembled on said jig.

7. The assembly jig of claim 6, wherein said first and second clamp means each includes at least one cylindrical roller member, said member being rotatable about a fixed vertical centerline axis, and an adjustably pivotable roller member that is also cylindrically shaped and rotatable about its respective centerline axis, said adjustably pivotable roller member being pivotable in a manner so that the angle of its centerline axis may be adjusted relative to the angle of said fixed vertical centerline axis, and clamp arm means, positioned adjacent said roller members, for pressing said web and spar chord tightly against said roller members.

8. The assembly jig of claim 7, wherein said first and second clamp means each further includes a pair of cylindrical roller members, each roller member of said pair being rotatable about a separate fixed vertical centerline axis, said pair being laterally spaced from each other, and wherein said adjustably pivotable roller member is positioned between said pair of roller members.

9. A universal spar assembly jig characterized in that said jig is adaptable for use in producing spars having varied sizes, the size of any one spar being dictated by the particular design in which the spar is to be used, wherein each of said spars commonly include an elongated web, and upper and lower chord sections extending, respectively, along upper and lower longitudinal edges of said web, said spar assembly jig comprising:

a plurality of vertically upstanding spar-holding posts, each post including first clamp means, positioned adjacent said web's upper longitudinal edge, for both holding said web in a vertically upright position and for holding said upper chord section against said upper longitudinal edge, and second clamp means, positioned adjacent said web's lower longitudinal edge, for both holding said web vertically upright and for holding said lower chord section against said lower longitudinal edge, wherein both said first and second clamp means are connected to said spar-holding post in a manner so that the vertical position of each clamp means is adjustable, to accommodate a variation in width of the web for the particular spar that is to be assembled on said jig, and wherein said first and second clamp means each includes at least one cylindrical roller member, said member being rotatable about a fixed vertical centerline axis, and an adjustably pivotable roller member that is also cylindrically shaped and rotatable about its respective centerline axis, said adjustably pivotable roller member being pivotable in a manner so that the angle of its centerline axis may be adjusted relative to the angle of said fixed vertical centerline axis, and clamp arm means, positioned adjacent said roller members, for pressing said web and spar chord tightly against said roller members.

10. The assembly jig of claim 9, wherein said first and second clamp means each further includes a pair of cylindrical roller members, each roller member of said pair being rotatable about a separate fixed vertical centerline axis, said pair being laterally spaced from each other, and wherein said adjustably pivotable roller member is positioned between said pair of roller members.

11. The assembly jig of claim 3, wherein said clamp arm means includes a member positioned against a surface of said chord having an end in which is received a rollable spherical ball, for permitting said chord to move relative to said web during fastening of said chord to said web.

* * * * *

UNITED STATES PATENT AND TRADEMARK OFFICE
CERTIFICATE OF CORRECTION

PATENT NO. : 4,995,146

DATED : February 26, 1991

INVENTOR(S) : Quentin T. Woods

It is certified that error appears in the above-identified patent and that said Letters Patent is hereby corrected as shown below:

On the cover page, under "U.S. PATENT DOCUMENTS", "2,492,302 by Stephan" should have been listed as a foreign patent, as it is a French patent.

In the Abstract, the next to last line, "construc" should be -- construct --.

Col. 1, line 12, before "U.S. Patent", insert -- the --.

Col. 3, line 8, after "like", insert -- parts --.

Claim 1, col. 5, line 9, "varies" should be -- varied --.

Signed and Sealed this

Fourth Day of August, 1992

*Attest:*

DOUGLAS B. COMER

*Attesting Officer*      *Acting Commissioner of Patents and Trademarks*